United States Patent
Krueger

(10) Patent No.: US 6,249,069 B1
(45) Date of Patent: Jun. 19, 2001

(54) OUTPUT REGULATION OF INTERNAL COMBUSTION ENGINE ALTERNATOR BY MECHANICAL MEANS

(75) Inventor: William R. Krueger, New Berlin, WI (US)

(73) Assignee: Bomardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/444,472

(22) Filed: Nov. 22, 1999

(51) Int. Cl.$^7$ .............................. H02K 7/02; H02K 1/01; H02K 1/06
(52) U.S. Cl. ..................... 310/74; 310/191; 310/209
(58) Field of Search ....................... 310/74, 191, 209, 310/254, 258, 259

(56) References Cited

U.S. PATENT DOCUMENTS

| | | | |
|---|---|---|---|
| 2,453,523 | 11/1948 | McCullough | 171/209 |
| 2,492,810 | 12/1949 | McDermott | 171/209 |
| 3,090,879 | 5/1963 | Lohest | 310/209 |
| 3,401,290 | 9/1968 | Potter | 310/191 |
| 3,525,005 | 8/1970 | Beyers | 310/156 |
| 3,553,510 * | 1/1971 | Howey | 310/156 |
| 4,363,984 * | 12/1982 | Torii et al. | 310/156 |
| 4,578,609 | 3/1986 | McCarty | 310/156 |
| 4,734,604 | 3/1988 | Sontheimer et al. | 310/76 |
| 4,920,295 | 4/1990 | Holden et al. | 310/209 |
| 5,530,305 * | 6/1996 | Krueger et al. | 310/74 |
| 5,834,874 * | 11/1998 | Krueger et al. | 310/191 |

* cited by examiner

Primary Examiner—Nestor Ramirez
Assistant Examiner—Dan Dinh Le
(74) Attorney, Agent, or Firm—Fletcher, Yoder & Van Someren

(57) ABSTRACT

A permanent magnet alternator employing a mechanically regulated output. The alternator contains a rotor, or a flywheel which houses a plurality of permanent magnets. A rotating magnetic flux field is created by the rotation of the flywheel. A stator assembly, including a plurality of windings or coils is disposed concentrically with the rotor and adjacent to the rotating flux field. The coils produce an electrical output based on their exposure to the rotating flux field. A control assembly is disposed concentrically within the stator assembly. The stator assembly is rotatably coupled to the control assembly and becomes axially displaced relative to the magnetic flux field as a result of rotation relative to the control assembly.

18 Claims, 3 Drawing Sheets

| RECTIFICATION CIRCUIT | REGULATOR | STORAGE CIRCUITRY | LOAD (ENG. FUEL INJECTION CIRCUIT) |
|---|---|---|---|
| 60 | 62 | 64 | 66 |

OUTPUT REGULATION OF INTERNAL COMBUSTION ENGINE ALTERNATOR BY MECHANICAL MEANS

BACKGROUND OF THE INVENTION

1. Field of the Invention

The present invention relates generally to alternators and in particular to a permanent magnet alternator whose output voltage can be mechanically regulated by varying the exposure of the alternator windings to a magnetic flux field.

2. Description of the Related Art

Permanent magnet alternators are utilized for conversion of mechanical energy into electrical energy. In one typical design, the basic alternator includes a permanent magnet rotor. Magnets are arranged within the rotor to create a magnetic flux field. This flux field is defined by the number of magnets used and the spatial arrangement of magnets. A stator is disposed within the rotor adjacent the magnets. The stator contains a plurality of conductive coils, or windings, which are exposed to the magnetic flux field created by the rotor. When this flux field changes, i.e., when the magnets are moved relative to the coils, an electromotive force (EMF) is induced in the coils, creating an electrical current. The current is then supplied to various electrical and auxiliary systems, such as voltage regulators, storage devices (i.e. batteries), electrical loads, and so forth. In vehicles, such alternators are often used in conjunction with an internal combustion engine for generating electrical power needed for operation.

Typical operation of a permanent magnet alternator involves rotating the rotor relative to the stator to create a continuously rotating magnetic flux field as seen by the stator. Exposure to the rotating flux field generates current through the coils. Rotation of the rotor is accomplished by application of mechanical force to the rotor. The applied force is usually supplied by a rotating shaft, concentrically coupled to the rotor. The rotor may thus be associated with a rotating member, such as a flywheel. The shaft may be the output shaft of an internal combustion engine, or it may be an independent shaft connected to gears or a series of belts and pulleys. However, regardless of the means of connection utilized, in an engine application the shaft and rotor are typically tied, in some form, to an output shaft of the internal combustion engine. Thus, when the engine speed increases, rotational speed of the rotor increases proportionally.

In such an arrangement as described above, the electrical output from the alternator is tied directly to engine speed. However, the electrical requirements, such as current and voltage, of any given system may vary at levels different from the engine speed. For example, the electrical supply requirements for an electrical system may increase exponentially in comparison to the speed of the engine. Thus, since the speed of the alternator is directly tied to the speed of the engine, the actual electrical output will not always match the electrical requirements of a given system, or these requirements may vary substantially during operation. One such example is an electronic fuel injector. As engine speed increases a fuel injector must deliver fuel at an increased rate. The fuel injector experiences an increase in load, and thus also has increased electrical requirements. It may become desirable in this example to supply electrical current at a rate greater than that which is typically available for the given engine speed if the two were to increase and decrease proportionally.

The opposite of the above example may also be at issue. An electrical system may have electrical supply requirements that remain constant independent of the engine speed. In this case, the electrical output of a typical alternator will equal the supply requirements of the system only at one particular engine speed. At all other engine speeds the electrical output will be either greater or less than that which is required by the electrical system.

Various electrical componentry is often utilized to control the output of a permanent magnet alternator. In particular, voltage regulators may be employed to condition generated power to conform to electrical system requirements. This componentry can, however, be quite costly as compared to other system circuits. Accordingly, there is a need for alternative schemes for regulating output of an alternator, particularly in internal combustion engine applications.

The present invention is directed to overcoming, or at lest reducing the affects of, one or more of the problems set forth above.

SUMMARY OF THE INVENTION

The invention provides a permanent magnet alternator with a mechanically regulated output. The alternator contains a rotor, or a flywheel which houses a plurality of permanent magnets. A rotating magnetic flux field is created by the rotation of the flywheel. A stator assembly, including a plurality of windings or coils is disposed concentrically with the rotor and adjacent to the rotating flux field. The coils produce an electrical output based on their exposure to the rotating flux field. A control assembly is disposed concentrically within the stator assembly. The stator assembly is rotatably coupled to the control assembly and becomes axially displaced relative to the magnetic flux field as a result of rotation relative to the control assembly.

The invention also provides for an internal combustion engine using a permanent magnet alternator which has a mechanically controlled output. The alternator having a control assembly including a control surface which interacts with a control follower for axial displacement of the stator relative to the rotating flux field in conjunction with rotational movement of the stator relative to the control element.

The invention also provides a method of mechanically regulating the output of an alternator through the implementation of a control. The control surface geometrically defines a path causing the stator assembly to become axially displaced relative to a rotating flux field in conjunction with rotational movement of the stator assembly relative to the control surface.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
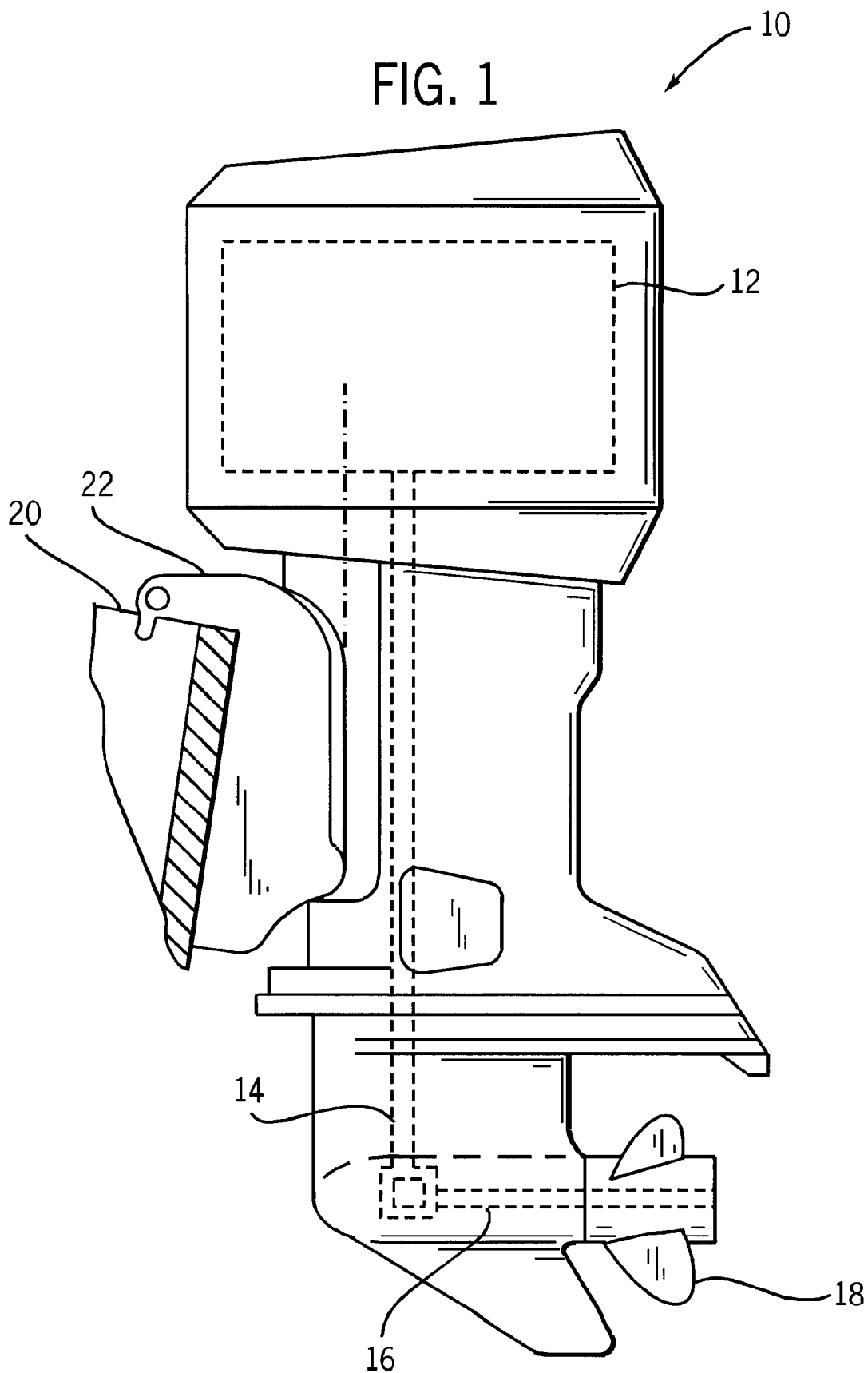
FIG. 1 is an elevational view of an outboard motor attached to a boat and employing an alternator arrangement in accordance with certain aspects of the invention.

Turning now to the drawings and referring first to FIG. 1, the context of the invention is shown as being an outboard motor 10 for a boat. The outboard motor 10, consists of various engine componentry 12, which may include a fuel delivery system, such as a plurality of fuel injectors, and electrical components, such as an alternator (none shown). An engine output shaft 14 is shown extending through the body of the outboard motor 10 and is coupled to a transmission shaft 16. The transmission shaft 16 is coupled to a screw propeller 18. Rotation of the engine output shaft 14 is transferred the transmission shaft 16 and the propeller 18 which creates a thrust when disposed in a body of water (not shown) in a generally known manner. The outboard motor 10 is typically attached to the rear section of a boat 20 by means of a motor mount 22.

Figure 2:
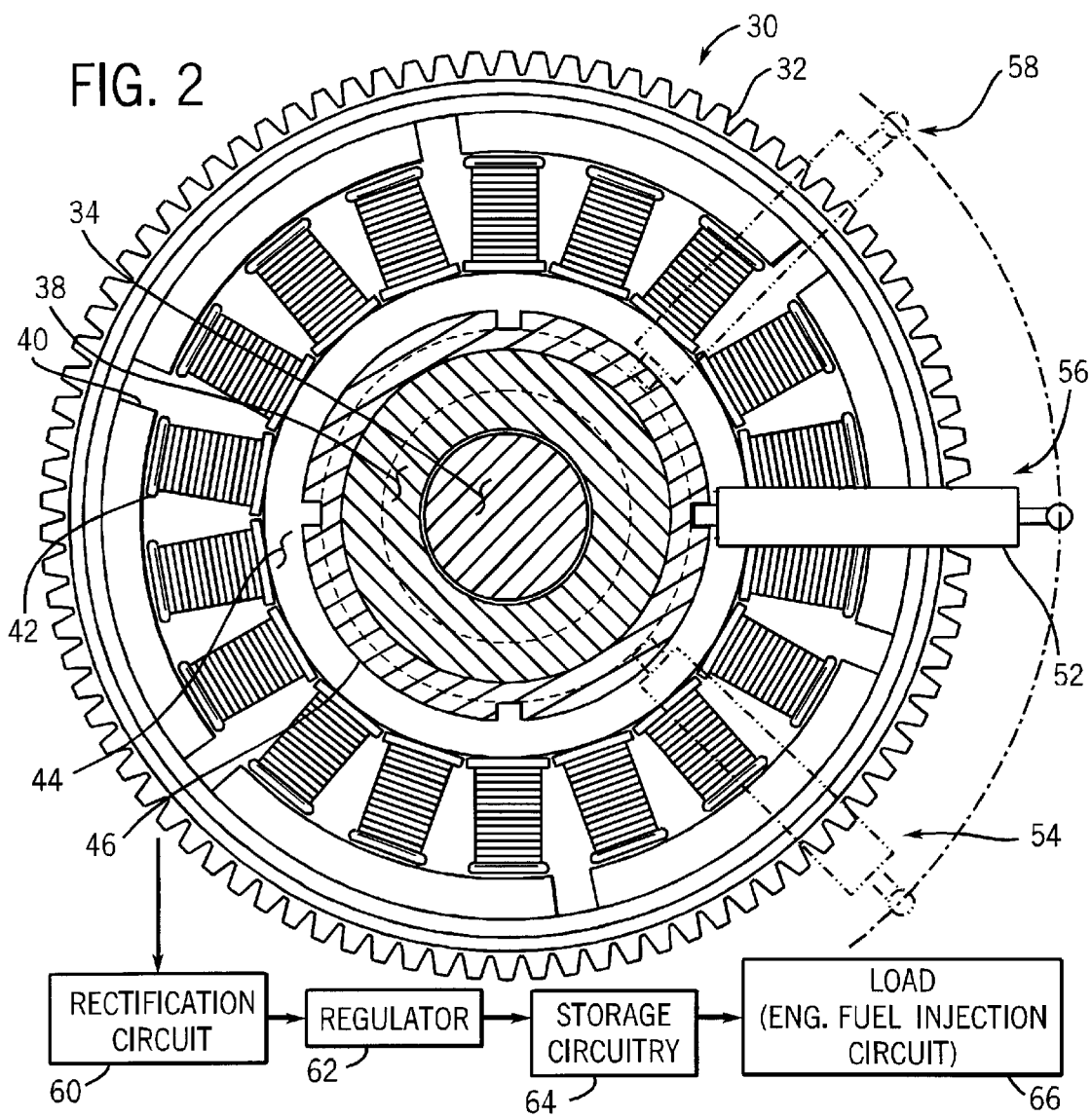
FIG. 2 is a sectional view of an embodiment of an alternator in accordance with aspects of the invention, showing a radial configuration of several elements of the device.
Figure 3:
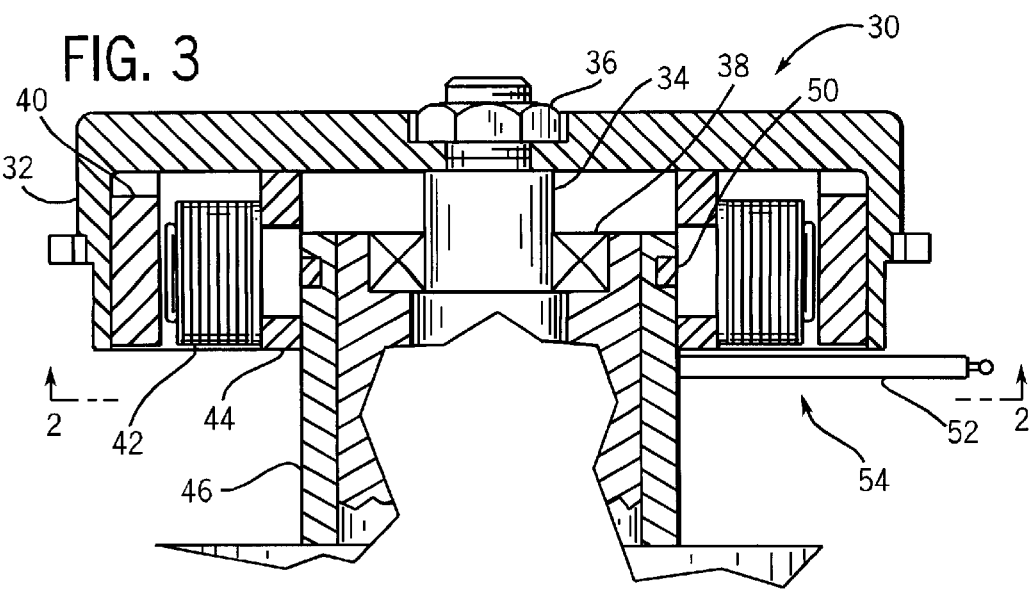
FIG. 3 is a sectional view of an embodiment of the invention showing a first position of a stator assembly.

Referring now to FIGS. 2 and 3, an alternator 30 according to one embodiment of the invention is disclosed. The alternator 30 has a rotor mounted within a flywheel 32, which is coupled to a shaft or spindle 34 by means of a fastener 36. The fastener 36 is shown as being a conventional hex nut, and is preferably a locking nut. However, various means, as known in the art may be utilized for connection of the flywheel 32 to the shaft 34. Use of splines, keyed components, setscrews and the like are all contemplated as being proper means for attachment.

A bearing 38 is disposed about the shaft which allows for rotation of the shaft 34 and the flywheel 32. The shaft 34 is typically connected to an output shaft from an internal combustion engine such as found in the outboard motor 10 of FIG. 1. The shaft 34 may be directly coupled to the engine, or it may be coupled through appropriate gearing or combinations of belts and pulleys. The shaft 34 causes the flywheel 32 to rotate at a speed which is proportional to the engine speed. While the speed ratio (i.e., the speed of the flywheel compared to the speed of the engine) may be changed through proper selection of gearing or pulleys, the speed of the shaft 32 and flywheel 34 will generally remain proportional to the speed of the engine.

Attached to an inner periphery of the flywheel 32 is a plurality of permanent magnets 40, such as ceramic magnets. In the embodiment shown, six magnets 40 are disposed radially within the flywheel 32 relative to the axis of the shaft 34. The magnets 40 are also shown to be angularly equispaced. The magnets 40 create a magnetic flux field and, when rotated with the flywheel 32, form a rotating flux field. The flux field is formed in the same plane in which the magnets 40 are rotated. While a particular arrangement of magnets 40 is shown in FIG. 2, it is contemplated that various configurations and numbers of magnets may be utilized for the purpose of the present technique without departing form the scope or spirit of the invention.

A stator including a plurality of coils, or windings 42, is disposed concentrically within the flywheel 32, and adjacent the magnets 40. In the illustrated embodiment, the coils 32 are also radially configured and mounted, and are angularly equispaced relative to the shaft 34. The coils 42 are coupled to a stator sleeve 44 and remain generally stationary relative to the flywheel 32 (i.e. do not rotate with the rotor). The coils 42 and the stator sleeve 44 comprise a stator assembly which is substantially annular in shape. An electrical current and voltage is induced in the coils 42 by virtue of their exposure to the rotating flux field. The induction of the current and voltage serves to convert the mechanical energy of the rotating flywheel 32 into electrical energy conveyed through the coils 32. Just as with the arrangement of the magnets 40, the specific arrangement of the coils 32 shown in FIG. 2 should not be construed as the only configuration contemplated. The coils 32 may be arranged in different quantities and geometries as suits the electrical and mechanical requirements of the specific application. As will be appreciated by those skilled in the art, leads (not separately shown) of the coils are interconnected to route electrical power generated in the coils during operation to downstream circuitry. Such circuitry, as depicted generally in FIG. 2, will typically include a rectification circuit 60 which receives the alternating current waveform from the alternator 10 and invert the negative lobes. Also included may be a voltage regulator 62 to further control and refine the electrical characteristics being produced by the alternator 10. Electrical supply or storage circuits 64, such as a battery, are typically included as well as various load circuitry 66 such as that which is associated with a fuel injector. In a typical application, numerous distribution circuits, as well as electrical loads of the engine or boat are connected downstream of a permanent magnet alternator.

A control assembly 46 is disposed concentrically within the stator sleeve 44. In a preferred embodiment, the control assembly includes a cylindrical sleeve which has a set of helical grooves 48, which, taken together, form a control surface. An interacting control element is formed on the inner periphery of the stator sleeve 40. In a presently preferred embodiment, a set of control followers 50, such as cam followers, serve as the interacting control element. The followers 50 are attached to the stator sleeve 44 and are configured lo interact with the helical grooves 48. A control arm, or a positioning member 52, is attached to the stator sleeve 44 to induce rotational movement of the stator sleeve 44 relative to the control assembly 46.

Figure 6:
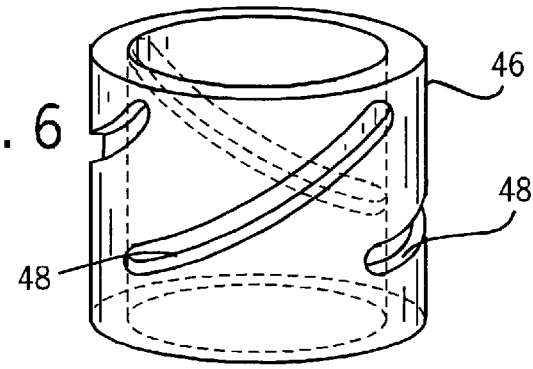
FIG. 6 is a perspective view of an exemplary control element having a control surface for regulating output of the alternator.

Referring to FIG. 6, the control surface, as formed by the helical grooves 48, defines a path along which the follower elements 50 move. Thus, the control surface on the control assembly 46 determines the path of movement for the stator sleeve 44 and coils 42.

The interaction of the helical grooves 48, as shown in FIG. 6, with the followers 50 causes the stator assembly to be axially displaced concurrently with the rotation of the stator assembly relative to the control assembly 46. The axial displacement of the stator assembly allows for variable and controllable exposure of coils 42 to the flux field. Thus, by rotating the stator sleeve 44 in one direction exposure of the coils 42 to the rotating magnetic flux field will be increased (i.e. the coils enter into the field axially), while rotation in the opposite direction will result in a decreased exposure of the coils 42 to the rotating magnetic flux field (i.e. the coils are withdrawn from the stator). The varied exposure of the coils 42 to the flux field will produce a proportionally varied electrical output based on the current and voltage induced into the coils 42. It is contemplated, as described in more detail below, that the interaction of the control assembly 46 and the stator assembly may be accomplished using alternative elements than those employed in the presently preferred embodiment illustrated.

In operation, the alternator 30 will have a varied electrical output based on the axial position of the coils 42 relative to the rotating flux field. The positioning member 52 serves to control the relative position of the coils 42 by controlling rotation of sleeve 44. As seen in FIGS. 2 and 3, the stator assembly and the positioning member 52 are seen in a first position 54. In this first position the positioning member 52 is shown to be rearward in FIG. 2, and the stator sleeve assembly is displaced axially toward the flywheel 32 fully exposing the coils 42 to the rotating magnetic flux field. The coils 42, being fully exposed to the rotating magnetic flux field, experience the maximum amount of induced electrical power that may be produced by the alternator 30. Correspondingly, a maximum output of electrical power is generated during operation of the alternator 30 in this first position 54

Figure 4:
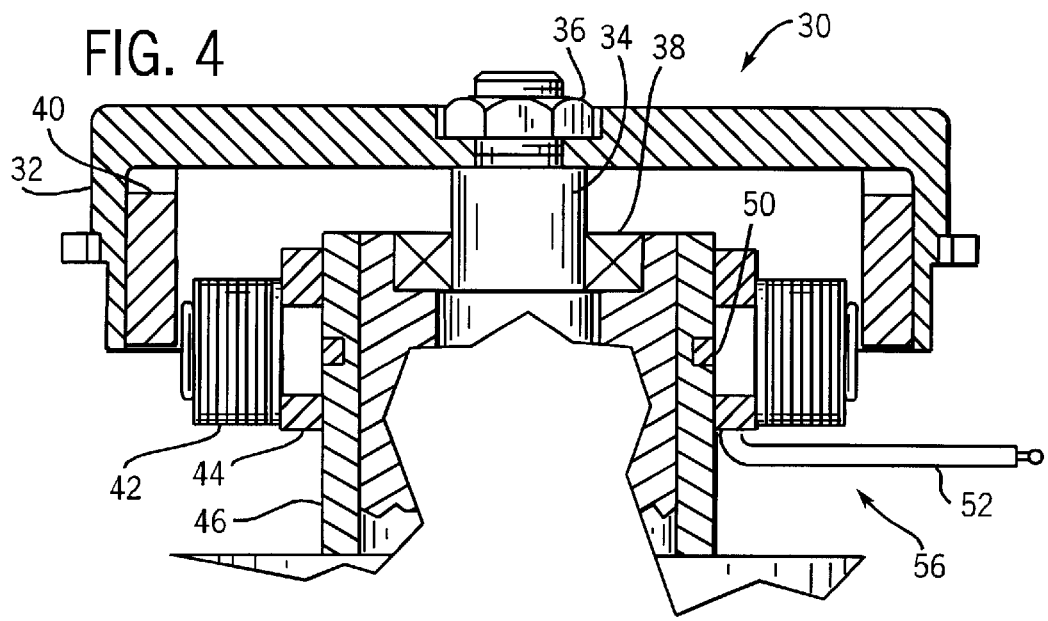
FIG. 4 is a sectional view of an embodiment of the invention showing a second position of a stator assembly.

A second position 56 is shown in FIGS. 2 and 4. In this second position, the positioning member 52 has been rotated counterclockwise (FIG. 2) through a predetermined angular range and consequently the stator assembly has been axially displaced downward a predetermined distance. The coils 42 are now only partially exposed to the rotating flux field and, therefore, the induced power is less than it would be in the first position 54. The electrical output of the alternator 30 in the second position 56 is, therefore, less than that of the alternator shown in the first position 54.

Figure 5:
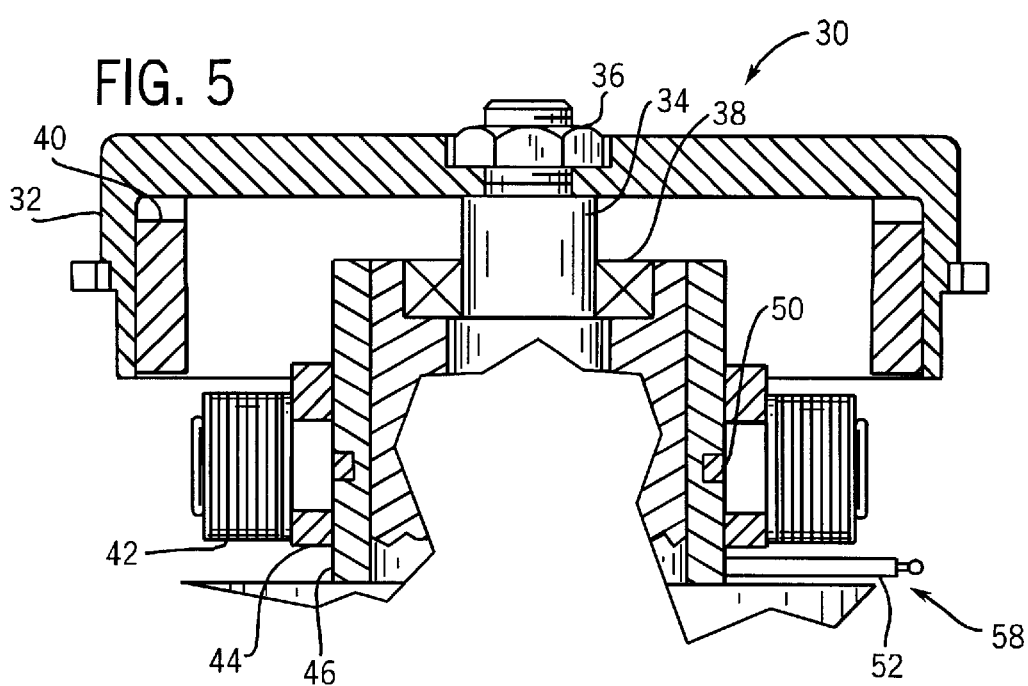
FIG. 5 is a sectional view of an embodiment of the invention showing a third position of a stator assembly.

A third position 58 is depicted in FIGS. 2 and 5. In this third position the positioning member 52 is rotated fully counterclockwise (FIG. 2) to the predetermined limit of rotation. The coils 42 and stator sleeve 44 are now axially displaced downwardly to the axial limit of travel. The coils 42 are now completely out of the range of exposure, or at a minimal exposure to the rotating flux field, resulting in a minimal power output in the coils.

While three different positions 54, 56, and 58 are shown in the figures and described herein, the above description is not intended to be limited to the three positions described. Rather, the first position 54 is shown to represent a maximum output for the alternator 30. Likewise, the third position 58 is included to represent a minimum output for the alternator 30. The second position 56, however, is exemplary of an intermediate position and its position is meant to represent any position between the predetermined maximum and minimum positions. Accordingly, a continuum of electrical output is created within the limits of the first and third positions 54 and 58 which may be defined according to specific electrical design requirements.

In the presently preferred embodiment a throttle cable (not shown) would be attached to the positioning member 52 to define a relationship between throttle position (or engine speed) the output of the alternator as determined by the axial position of the stator assembly relative to the rotating magnetic flux field. For example, as the throttle is increased, the positioning member would cause rotation of the stator assembly relative to the control assembly 46 inducing axial displacement toward of the stator assembly towards the flywheel 32 and rotor. The coils 42 would obtain greater exposure to the rotating flux field and generate a greater amount of electrical energy for delivery to various components, such as fuel injectors. By decreasing the throttle, the opposite would occur, causing less exposure of the coils 42 to the flux field and generation of a smaller amount of electrical energy. It is noted that the opposite relationship between stator assembly positioning and engine speed could also be simply defined.

In the presently preferred embodiment, it is contemplated that, while a simple helix is shown to define the path of travel experienced by the stator assembly, alternative paths may be defined. For example, a path may be defined to create linear output (i.e., proportional with engine speed) or it may be defined to create non-linear output (i.e., an exponential or other increase in alternator output when compared to corresponding engine speed). Likewise, the control surface may be defined by a set of either right or left hand helical grooves or threads. The ability to choose between a right hand or left hand control surface may become important in employing various assembly and design options.

Other alternative embodiments are also contemplated as being within the scope of the invention. For example, referring to FIG. 6, it is noted that the control assembly 46 is shown to have a control surface 48 including a plurality of helical grooves or channels. In an alternative embodiment only one helical groove, and thus one follower 50 may be necessary. Another alternative embodiment may include a plurality of multiple lead threads forming the control surface of the control assembly 46 with a set of mating threads formed on the inner periphery of the stator sleeve 44.

Yet another alternative would be to reverse the locations of the helical grooves 48 and the followers 50. In such an embodiment the followers 50 would be coupled to the control assembly 46 and the helical groove would be formed in the inner periphery of the stator sleeve 44. Another embodiment would allow the control assembly 46 to be rotatable while keeping the stator assembly rotatably stationary but axially displaceable. All of the above embodiments would allow for relative rotation of the control assembly 46 and the stator assembly 42 and 44 while concurrently causing axial displacement of the coils 42 with respect to the rotating flux field. Thus variable electrical output of the alternator would be obtained in each of the above embodiments.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An alternator with a mechanically regulated output comprising:

a permanent magnet rotor adapted for coupling with, and rotation by, a shaft to create a rotating magnetic flux field;

a substantially annular stator assembly disposed adjacent the magnetic flux field and concentric with the rotor, the stator including a plurality of windings disposed on the stator for the generation of electrical current in response to the rotating magnetic flux field; and a mechanical control assembly coupled to the stator wherein the stator assembly and the control assembly are rotatable relative to each other within a predetermined angular range, and wherein the stator assembly is simultaneously axially displaced relative to the magnetic flux field by relative rotation of the stator assembly and the control assembly based upon an operating parameter of an engine.

2. The alternator of claim 1, further comprising a flywheel, wherein the permanent magnet rotor is disposed on an inner periphery of the flywheel.

3. The alternator of claim 1, further comprising at least one follower element on the stator assembly, and wherein the control assembly includes a control surface comprising at least one substantially helical groove, wherein the at least one follower element is disposed within the at least one helical groove.

4. The alternator of claim 3, wherein the at least one substantially helical groove defines a linear relationship between angular rotation of the stator assembly relative to the control assembly and axial displacement of the stator assembly relative to the magnetic flux field.

5. The alternator of claim 3, wherein the at least one substantially helical groove defines a non-linear relationship between angular rotation of the stator assembly relative to the control assembly and axial displacement of the stator assembly relative the magnetic flux field.

6. The alternator of claim 1, further comprising at least one follower element on the control assembly, and wherein the stator assembly comprises at least one substantially helical groove, wherein the at least one follower element is disposed within the at least one helical groove.

7. The alternator of claim 1, wherein the control assembly includes a control surface comprising a first set of multiple threads, and wherein an inside periphery of the stator assembly includes a second set of multiple threads which mate with the first set of multiple threads.

8. The alternator of claim 1, wherein the control assembly includes a stationary member and the stator assembly rotates relative to the stationary member.

9. The alternator of claim 8, further comprising a positioning member coupled to the stator assembly for inducing angular displacement of the stator assembly.

10. The alternator of claim 9, wherein the positioning member is coupled to a throttle control member.

11. The alternator of claim 1, wherein the operating parameter is engine speed.

12. The alternator of claim 1, wherein the operating parameter is throttle position.

13. An alternator with a mechanically regulated output comprising:

a flywheel adapted for coupling with and rotation by a shaft;

a permanent magnet rotor disposed on the flywheel for creating a magnetic flux field;

a substantially annular stator assembly concentrically disposed adjacent the magnetic flux field, the stator assembly having a follower element disposed thereon, and a plurality of windings for generating electrical current;

a control assembly concentrically disposed with respect to the stator assembly, the control assembly having a substantially helical groove, wherein the follower element engages the substantially helical groove; and a positioning member coupled to the stator assembly and positionable based upon an operating parameter of an engine for inducing rotational motion of the stator assembly relative to the control assembly within a predetermined angular range, and wherein the stator assembly is simultaneously axially displaced relative to the magnetic flux field when the stator assembly is rotated relative to the control assembly.

14. The alternator of claim 13, wherein the flywheel configured to be drivingly coupled to an internal combustion engine.

15. The alternator of claim 13, wherein the stator assembly includes a plurality of follower elements, each follower element engaging a respective helical groove of the control assembly.

16. The alternator of claim 13, wherein the helical groove defines a substantially linear relationship between the operating parameter of the engine and the axial position of the stator.

17. The alternator of claim 16, wherein the operating parameter is a throttle setting.

18. The alternator of claim 16, wherein the operating parameter is engine speed.

* * * * *